United States Patent
Ponomarev et al.

(10) Patent No.: US 7,017,705 B2
(45) Date of Patent: Mar. 28, 2006

(54) BLAST COMPRESSION WAVE ABSORBING DEVICE

(76) Inventors: Vladimir Ponomarev, 649 Davey Dr., Port Elgin, Ontario (CA) N0H 2C3; Iryna Ponomaryova, 649 Davey Dr., Port Elgin, Ontario (CA) N0H 2C3

(*) Notice: Subject to any disclaimer, the term of this patent is extended or adjusted under 35 U.S.C. 154(b) by 0 days.

(21) Appl. No.: 10/349,141

(22) Filed: Jan. 23, 2003

(65) Prior Publication Data
US 2006/0027419 A1    Feb. 9, 2006

(51) Int. Cl.
*B64F 1/26* (2006.01)
(52) U.S. Cl. .................................................... 181/210
(58) Field of Classification Search ............... 181/106, 181/108, 116, 210–221, 232, 237
See application file for complete search history.

(56) References Cited

U.S. PATENT DOCUMENTS

| | | | | |
|---|---|---|---|---|
| 4,834,210 A | * | 5/1989 | Kennedy | 181/106 |
| 5,394,786 A | * | 3/1995 | Gettle et al. | 86/50 |
| 5,645,184 A | * | 7/1997 | Rowse et al. | 220/1.5 |

FOREIGN PATENT DOCUMENTS

| | | |
|---|---|---|
| CA | 2284694 | 10/1998 |
| CA | 2314245 | 6/1999 |
| CA | 2335788 | 1/2000 |
| CA | 2368716 | 7/2003 |

* cited by examiner

*Primary Examiner*—Kimberly Lockett

(57) ABSTRACT

A blast compression wave absorbing device comprises a container filled with gas or air under pressure below ambient pressure (under vacuum). The device is positioned close to the facility or structure being protected, in atmosphere or under water. When a blast compression wave reaches the device, in accordance with various embodiments of the invention, the container collapses, ruptures, or its interior is being connected to the environment through rupturable diaphragm or fast-actuating valve. The ambient air starts to fill the internals of the container generating a negative pressure wave, which interferes with blast compression wave and produces a resulting pressure wave with reduced pressure and impulse affecting the facility or structure to be protected. The device can be used in a counter-terrorism operations, to protect high-risk facilities (nuclear and military installations, petrochemical plants, embassies), submerged structures, or to protect personnel in tunnels and bunkers from shock waves of fuel-air explosives.

12 Claims, 18 Drawing Sheets

BLAST COMPRESSION WAVE ABSORBING DEVICE

CROSS-REFERENCE TO RELATED APPLICATIONS

Not applicable

BACKGROUND OF THE INVENTION

1. Field of Invention

The present invention relates to blast effects suppression devices used to limit the damage associated with explosions, specifically, to reduction, of impulse and overpressure of compression waves in order to minimize the damages in area being protected.

2. Background of the Invention

Terrorist bombings have always been a problem. In many instances, the bomb or explosive device is placed ⅔ close to public buildings, embassies, sensitive (nuclear) installations, often in a parked vehicle. The damage associated with explosion is related to air compression waves (also known as pressure waves or shock waves). The duration of this overpressure may be milliseconds or more, and significant impulse associated with compression wave results in damages to structures (buildings) especially to buildings having large surface areas.

Various means can be used to reduce compression wave effects: solid barriers (including blast mats), foams (foam glass, aqueous foams), plastic bags filled with water, mechanical venting, and chemical agents. Solid barriers and blast mats deflect shock waves or absorb wave energy from shock waves through momentum transfer to supporting structure; therefore, they cannot be used to protect the internal or external surface of the buildings or structures from the impulse associated with the shock wave. In addition, they are not effective in confined spaces.

Foam glass, aqueous foams, and plastic bags filled with water are effective being close to the source of shock wave, if the location of bomb is known. They are not effective in protection of large areas or protection from remote explosions.

Mechanical venting is employed to reduce the overpressure and associated stress in containment structures below the level allowable by design. Being effective in reducing the impulse, it cannot reduce the peak overpressure due to response time problem.

Chemical agents suppress shock waves by extinguishing the combustion process, which generates them. Such agents are effective if used to suppress the explosion at a source.

The examples of explosion and shock wave suppression devices are shown in the following patents granted in Canada:

U.S. Pat. No. 2,284,694 John Donovan et al,
U.S. Pat. No. 2,314,245 John Bureaux et al,
U.S. Pat. No. 2,335,788 Donald Butz et al.

The U.S. Pat. No. 2,284,694 discloses a method and apparatus for enclosing, controlling and suppressing the explosive destruction of munitions in an explosion chamber. Plastic bags of water are suspended within the chamber over the detonation area and filled with water.

In U.S. Pat. No. 2,314,245, an apparatus for explosive blast suppression, and a method therefor, is disclosed. The apparatus comprises a hemispherical enclosure, positioning means associated with the enclosure, for positioning the explosive device substantially equidistant from any point on the wall. The enclosure is made of composite textile material, comprising one or several layers of a ballistic material.

In U.S. Pat. No. 2,335,788, a blast suppression system is disclosed. The system includes a plurality of command-actuated units located in the immediate vicinity of a bomb. Each of the units has nozzles configured to disperse the suppressant material into the air surrounding the bomb. Preferably, the transmission occurs prior to the explosion of the bomb.

The prior art does not address the issue of absorption and dissipation of peak overpressure and impulse of the compression wave from remote or internal explosions provided the position of explosive charge is unknown. If the impulse is absorbed, it is fully transferred to a supporting structure. Nor the prior art addresses the issue of protection from fuel-air explosives (FAE) and associated compression waves. The FAE shock waves are known as having lower peak pressure, longer duration and higher impulse. It is desirable to provide a device that absorbs the compression wave and reduce the structural and bodily injury caused by the blast over-pressure and associated impulse.

BACKGROUND OF THE INVENTION—OBJECTS AND ADVANTAGES

Accordingly, several objects and advantages of the present invention are:
(a) to provide a blast compression wave absorbing device which allows reduction of peak overpressure without transfer of impulse to supporting structure;
(b) to provide a blast compression wave absorbing device able to reduce the impulse transferred to the structure to be protected being attached to the same structure;
(c) to provide a blast compression wave absorbing device which can protect the large areas of building from distance;
(d) to provide a blast compression wave absorbing device able to suppress compression waves from fuel-air explosives (FAE);
(e) to provide a blast compression wave absorbing device with ability to reduce the overpressure and associated stress in containment structures where venting is not sufficient.

Further objects and advantages of my invention will become apparent from a consideration of the drawings and ensuing description.

SUMMARY OF THE INVENTION

The present invention provides a blast compression wave absorbing device, comprising means for generation of a negative pressure wave in predetermined area near the object to be protected. After explosion, the negative pressure wave interferes with a blast compression wave and reduces its peak pressure and duration.

DRAWINGS

In the drawings, closely related figures have the same number but different alphabetic suffixes.

Figure 3A:
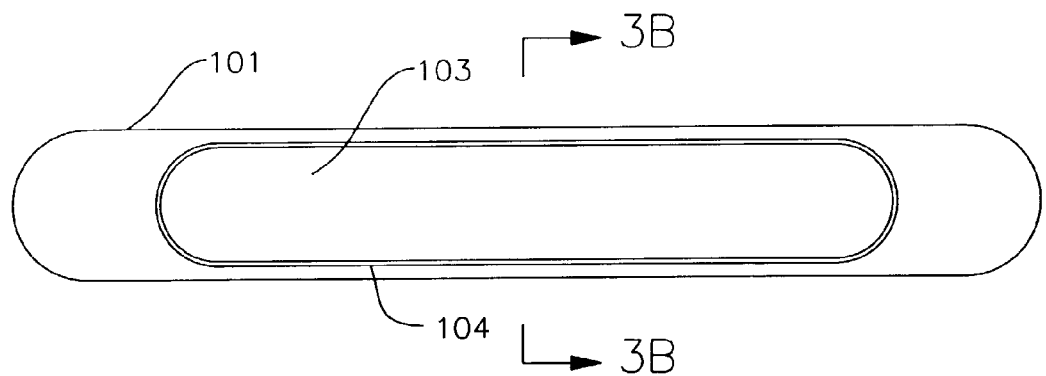
Figure 3B:
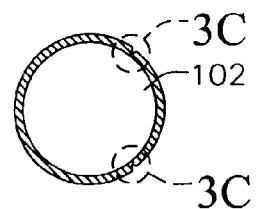
Figure 3C:
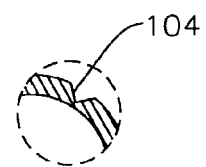

FIGS. 3A, 3B, and 3C show the blast compression wave absorbing device according to one embodiment of the present invention in a form of container having rupturable diaphragm.

Figure 4A:
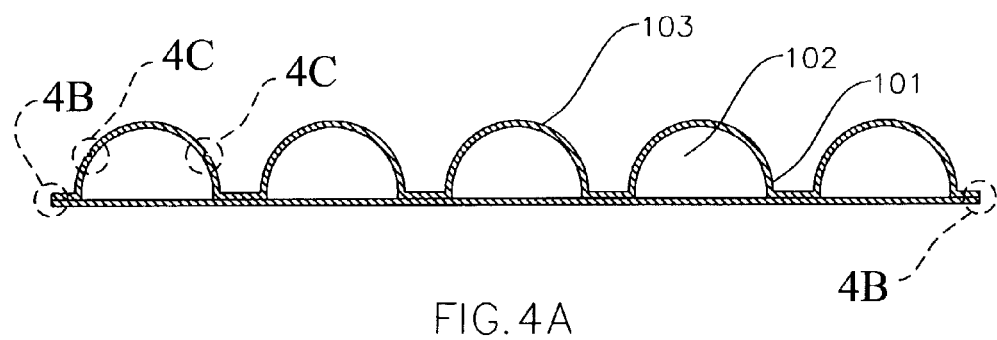
Figure 4B:
Figure 4C:
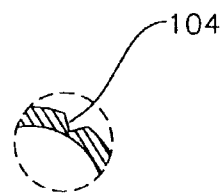

FIGS. 4A, 4B, and 4C show a cross-sectional view of the blast compression wave absorbing device according to one embodiment of the present invention in a form of collapsible container consisting of a plurality half-cylinders having rupturable diaphragms and welded to a flat metal sheet.

Figure 5A:
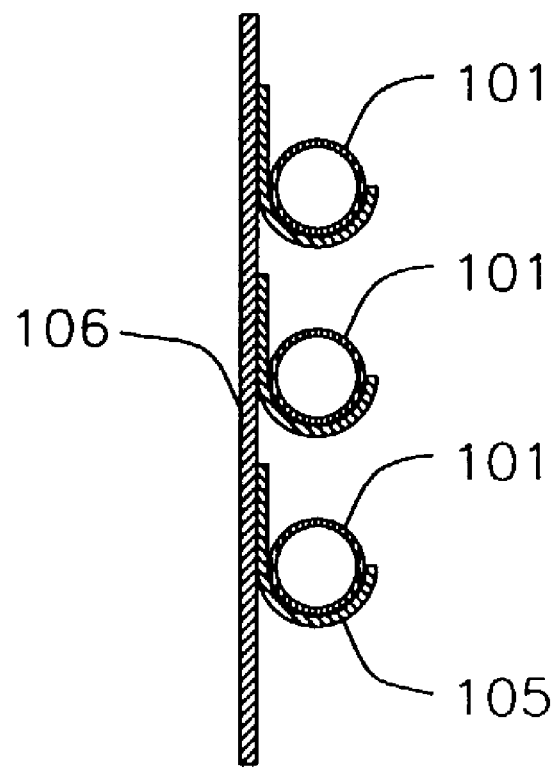

FIG. 5 shows a cross-sectional view of collapsible containers attached to a wall and held in place by mounting means.

Figure 6A:
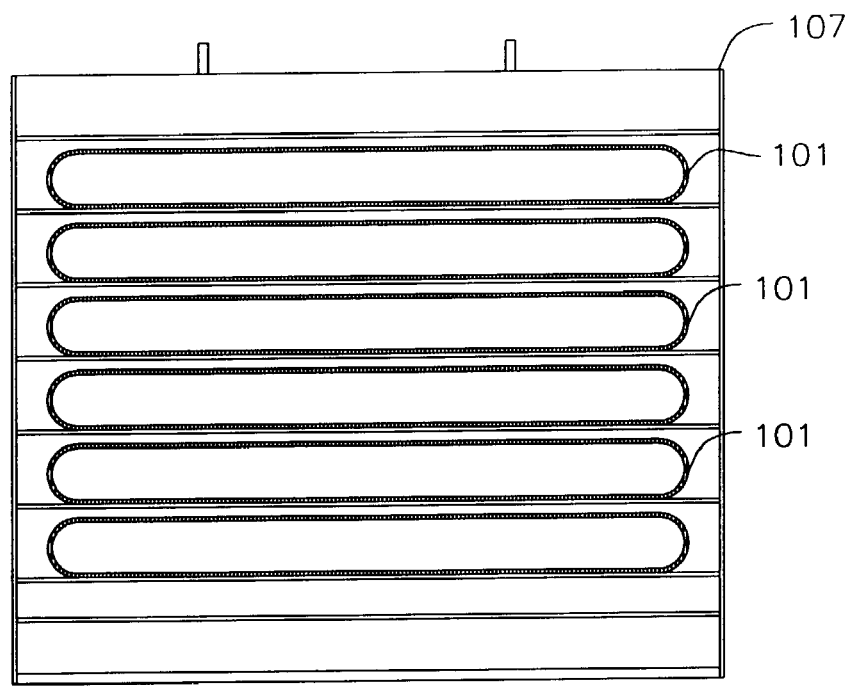
Figure 6B:
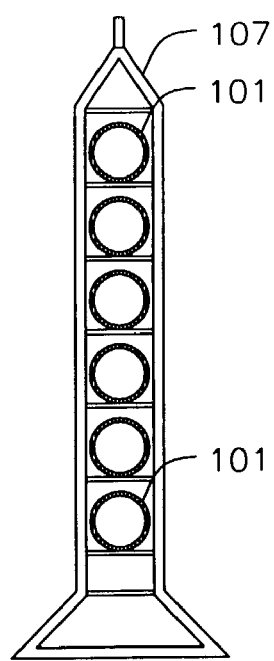

FIG. 6 shows a cross-sectional view of a frame structure with collapsible containers to be placed on a ground level.

Figure 7:
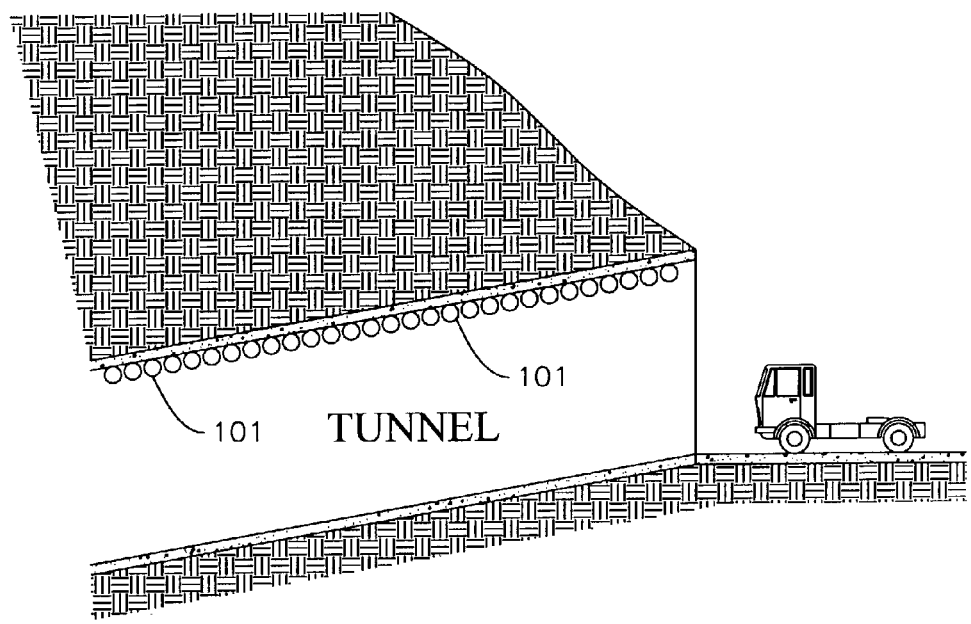

FIG. 7 shows a cross-sectional view of a tunnel with collapsible containers attached to a ceiling and held in place by mounting means (mounting means are not shown).

Figure 8:
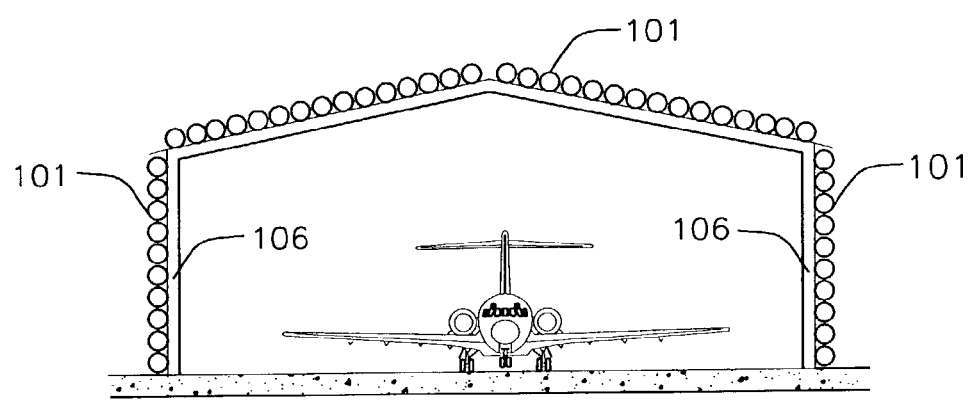

FIG. 8 shows a cross-sectional view of a hangar with collapsible containers attached to external surfaces of the roof and the walls.

Figure 9:
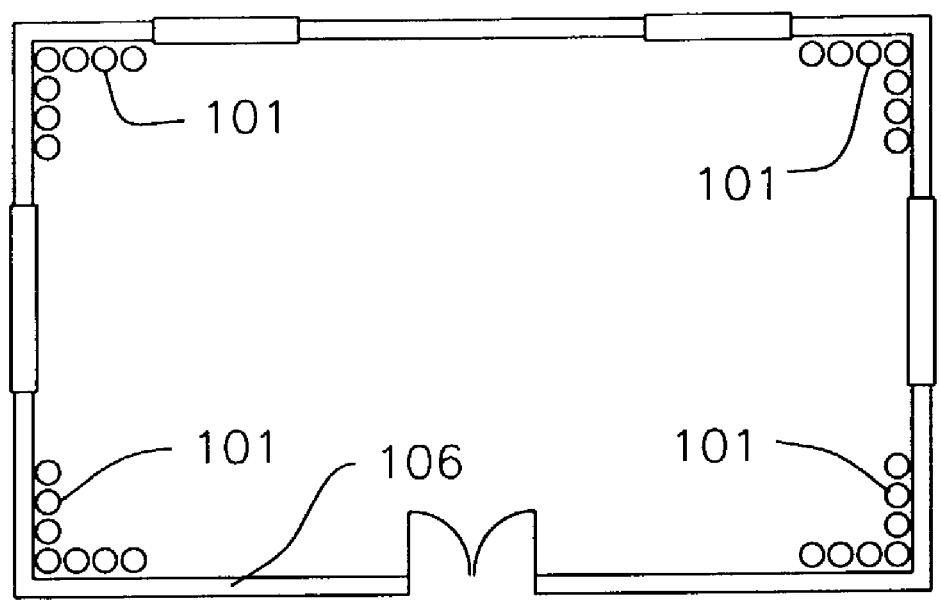

FIG. 9 shows a plan view of a building with collapsible containers attached to internal surfaces of the walls (mounting means are not shown).

Figure 10:
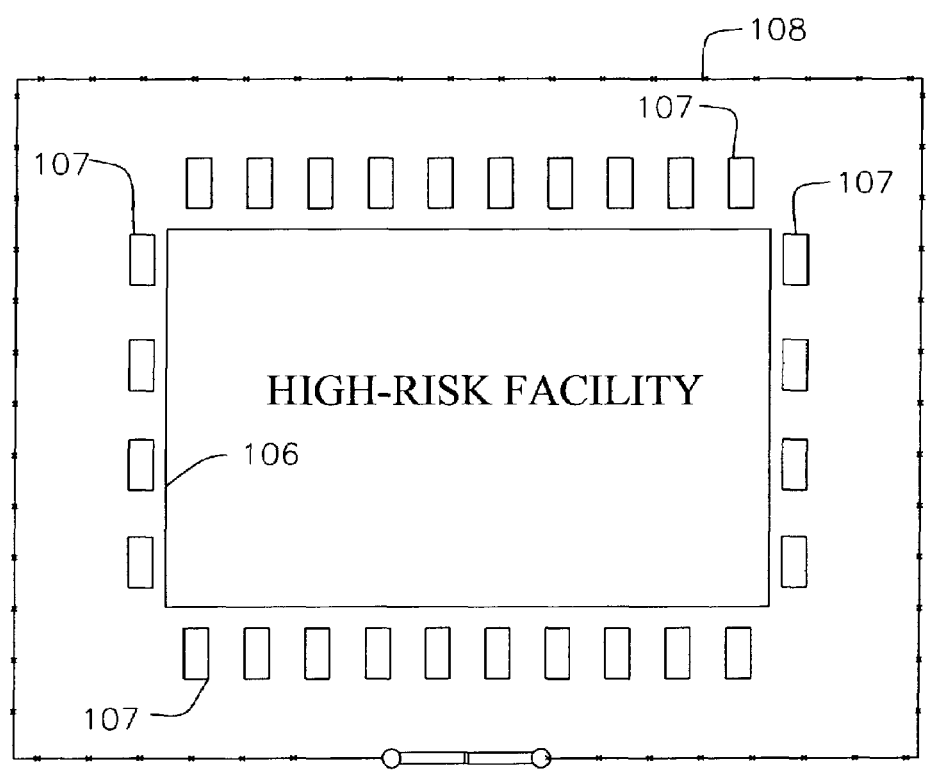

FIG. 10 shows a top-plan view of a high-risk facility (embassy, nuclear installation, etc) having a plurality of frame structures with collapsible or rupturable containers placed on the ground level around the building.

Figure 11A:
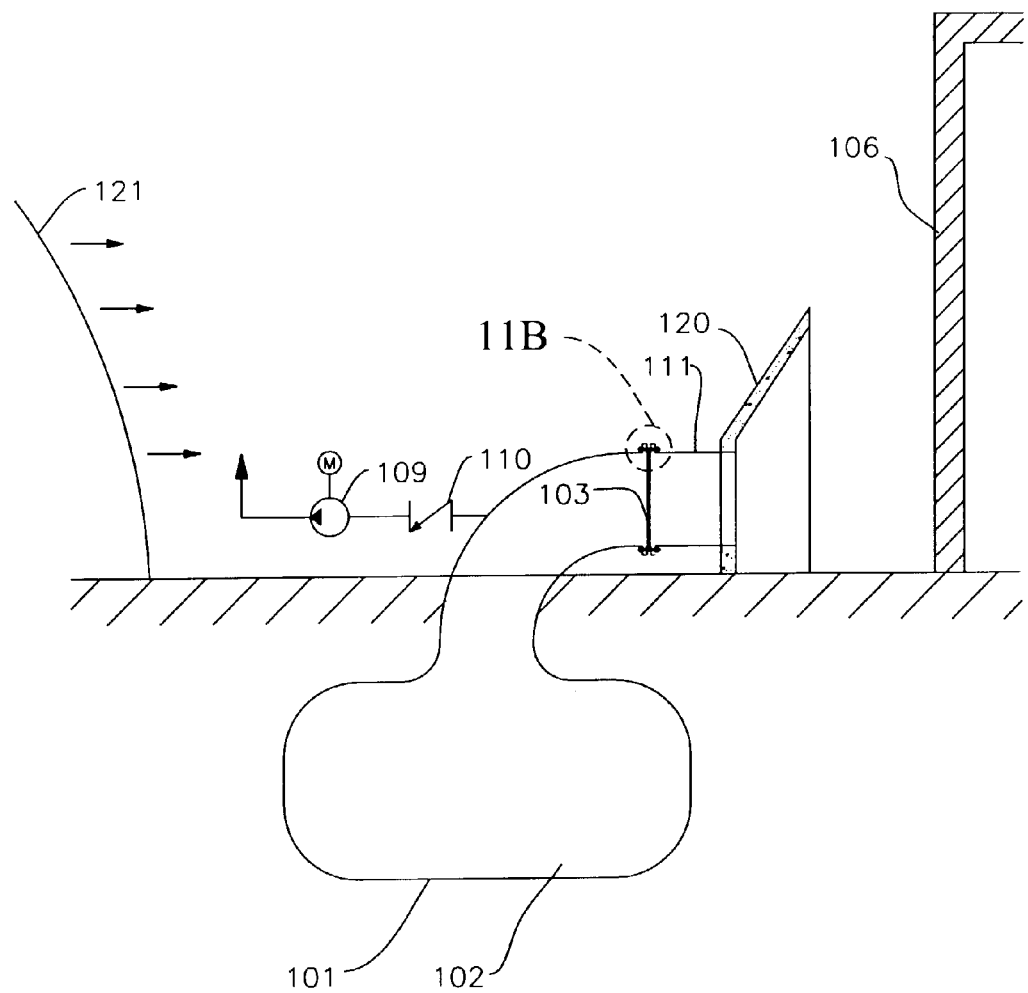
Figure 11B:
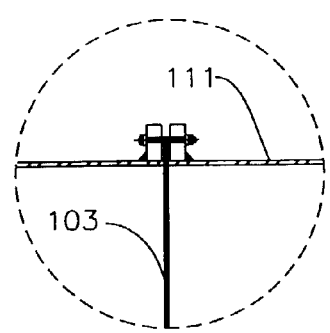

FIGS. 11A and 11B show a semi-diagrammatic view of the blast compression wave absorbing device having a container located under ground level, a rupturable diaphragm, a diffuser to direct a negative pressure wave to the wall of the object being protected, and a vacuum pump.

Figure 12A:
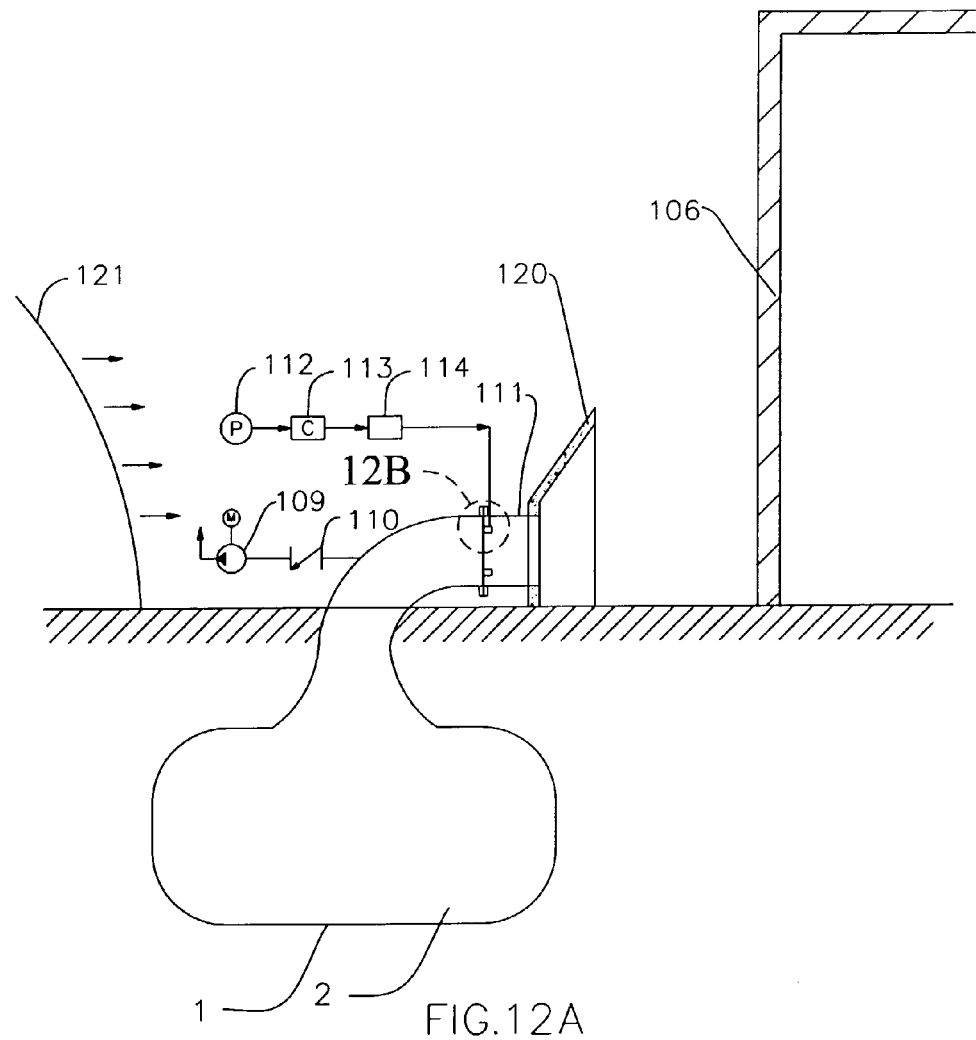
Figure 12B:
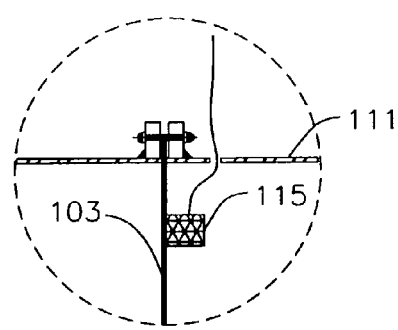

FIGS. 12A and 12B show a semi-diagrammatic view of the blast compression wave absorbing device having a container located under ground level, a rupturable diaphragm with small pyrotechnic charges and activation circuit, a diffuser to direct a negative pressure wave to the wall of the object being protected, and a vacuum pump.

Figure 13:
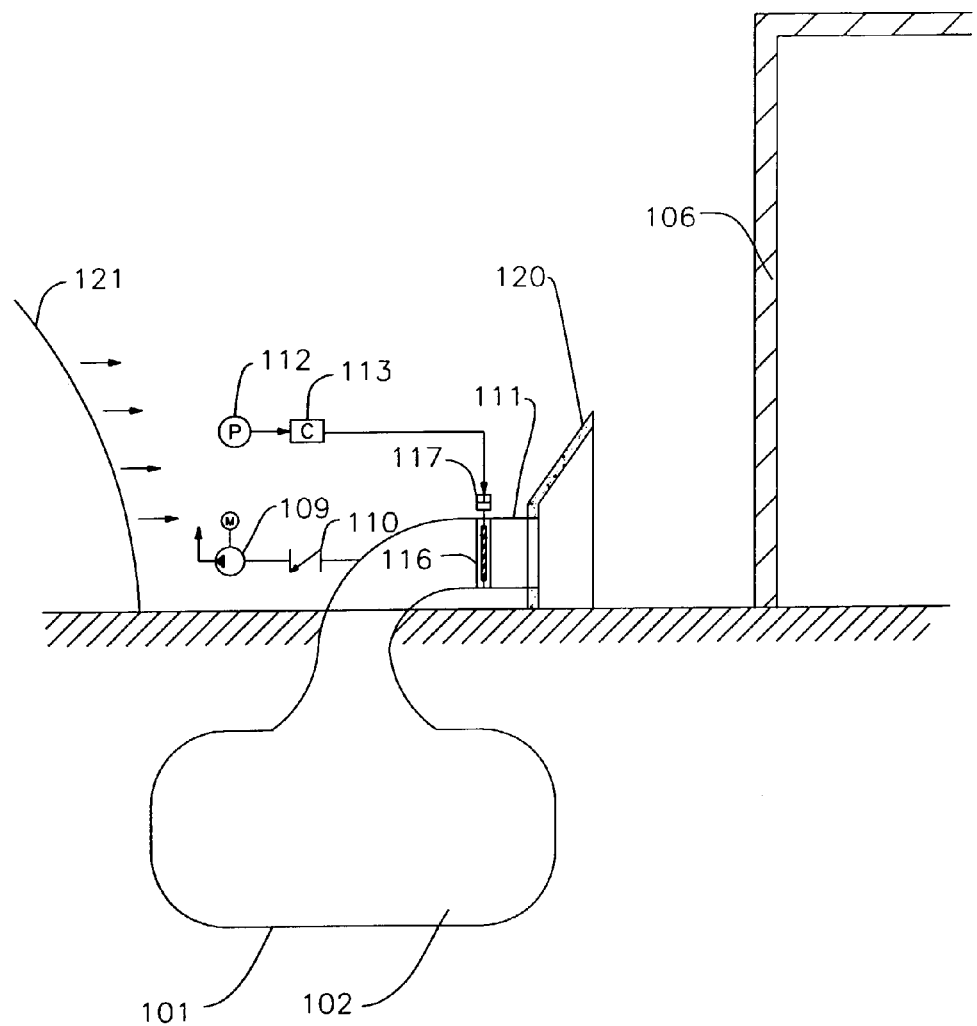

FIG. 13 shows a semi-diagrammatic view of the blast compression wave absorbing device having a container located under ground level, a valve with actuator and activation circuit, a diffuser to direct a negative pressure wave to the wall of the object being protected, and a vacuum pump.

Figure 14:
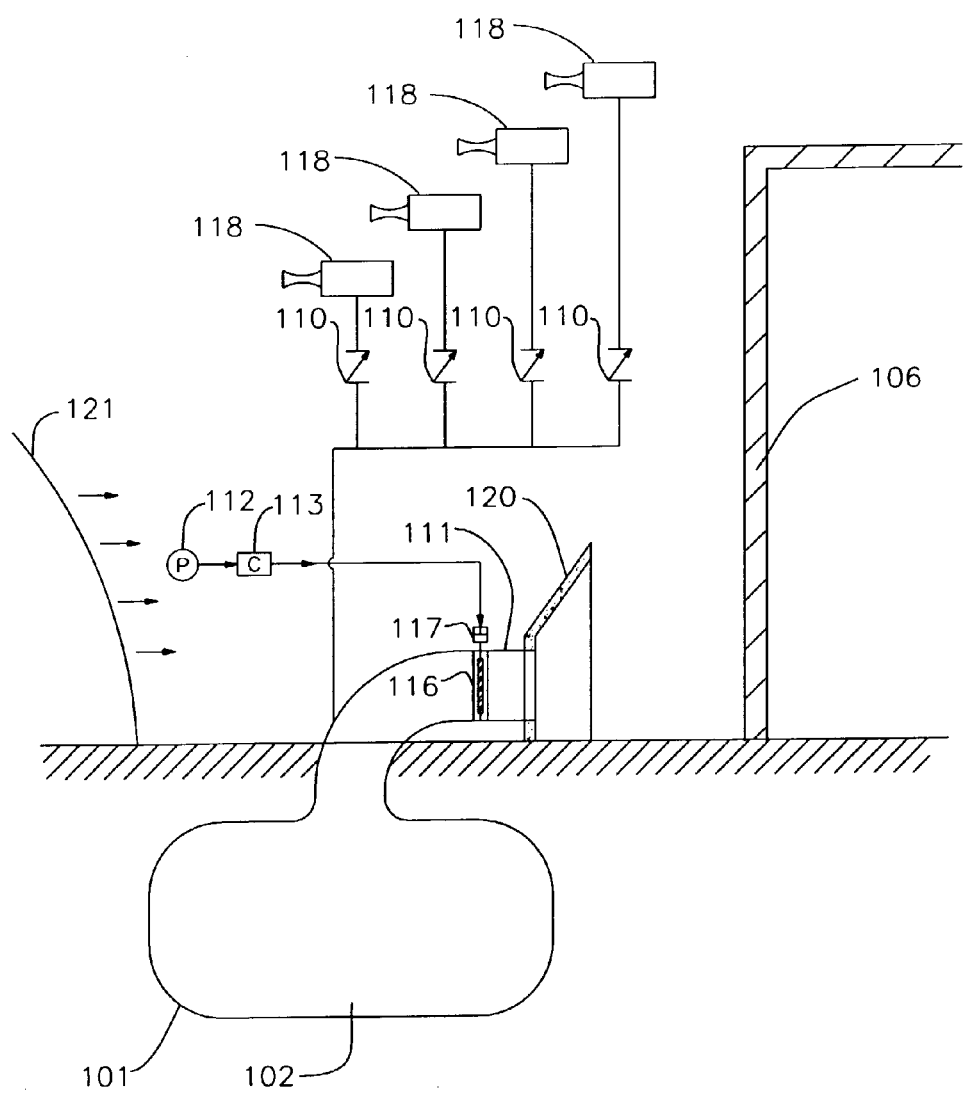

FIG. 14 shows a semi-diagrammatic view of the blast compression wave absorbing device having a container located under ground level, a valve with actuator and activation circuit, a diffuser to direct a negative pressure wave to the wall of the object being protected, and a plurality of gas ejectors.

Figure 15:
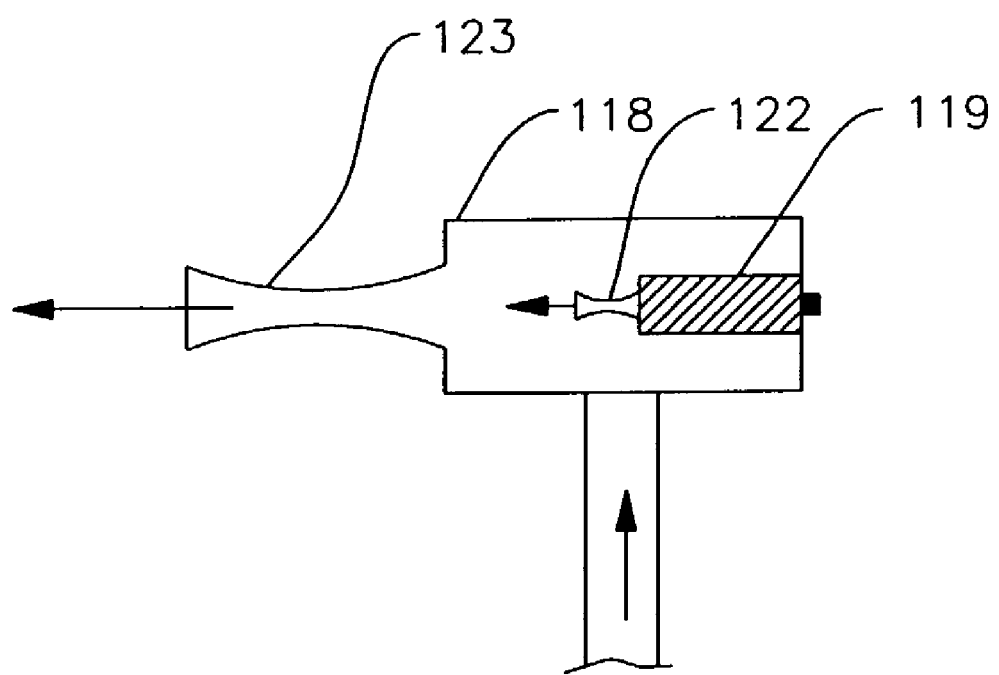

FIG. 15 shows a cross-sectional view of gas ejector having solid fuel gas generator as a source of compressed gas (activation circuit is not shown).

Figure 16:
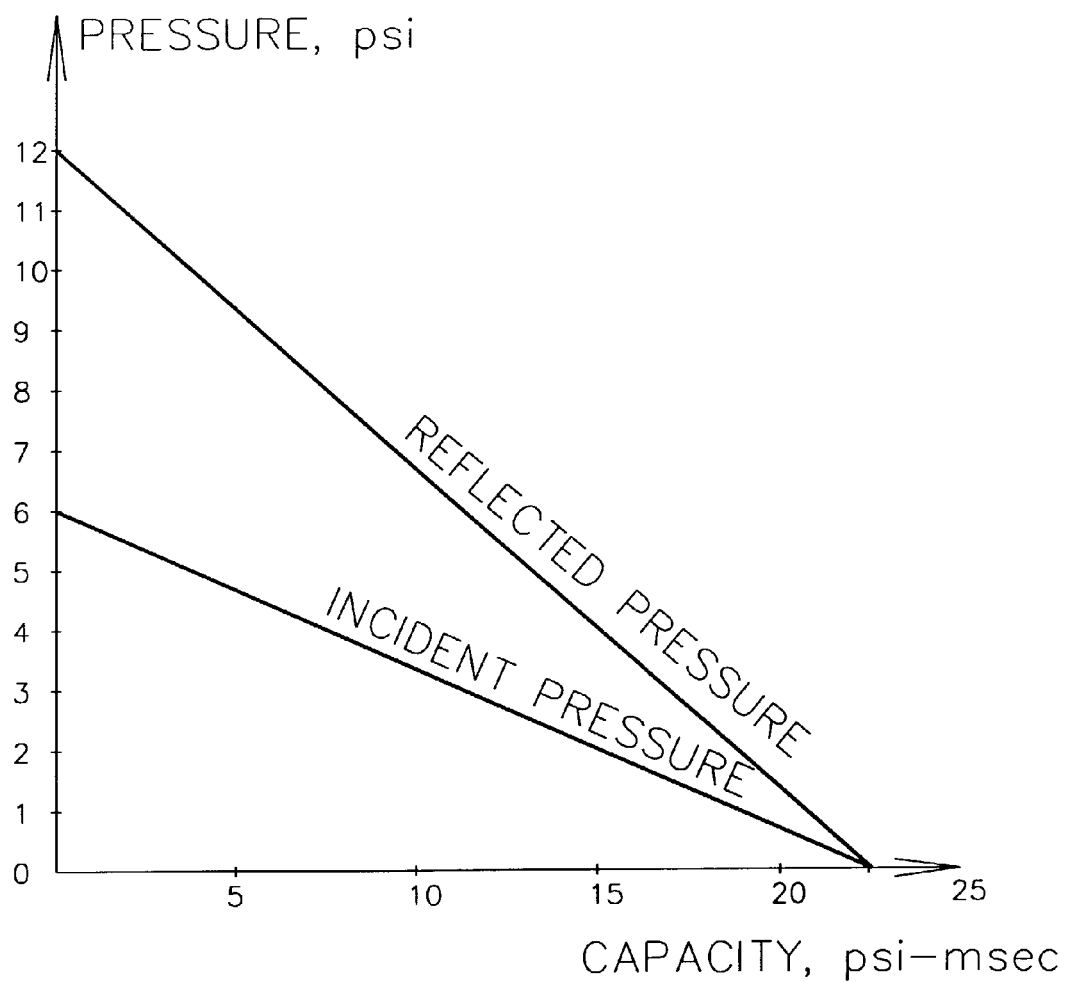

FIG. 16 discloses a graph demonstrating the reduction in incident and reflected pressure of blast compression wave vs. capacity of blast compression wave absorbing device.

Figure 17:
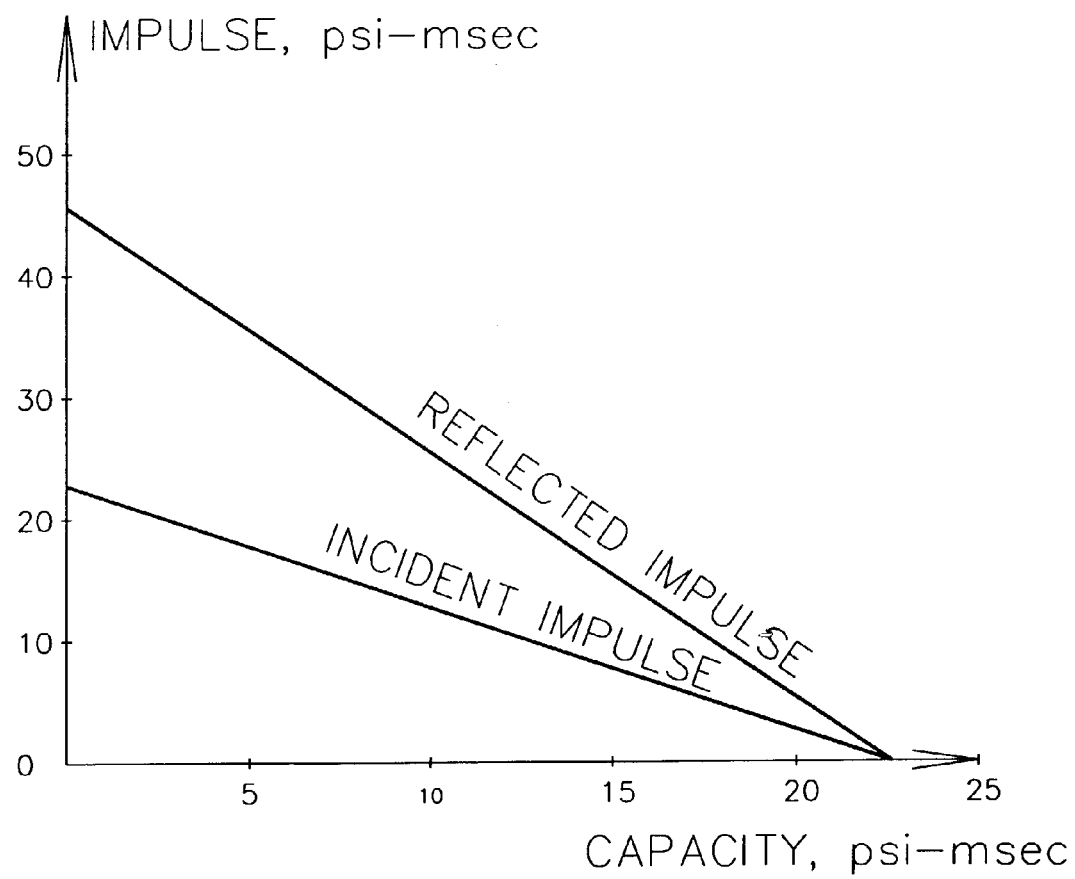

FIG. 17 discloses a graph demonstrating the reduction in incident and reflected impulse of blast compression wave vs. capacity of blast compression wave absorbing device.

Figure 18:
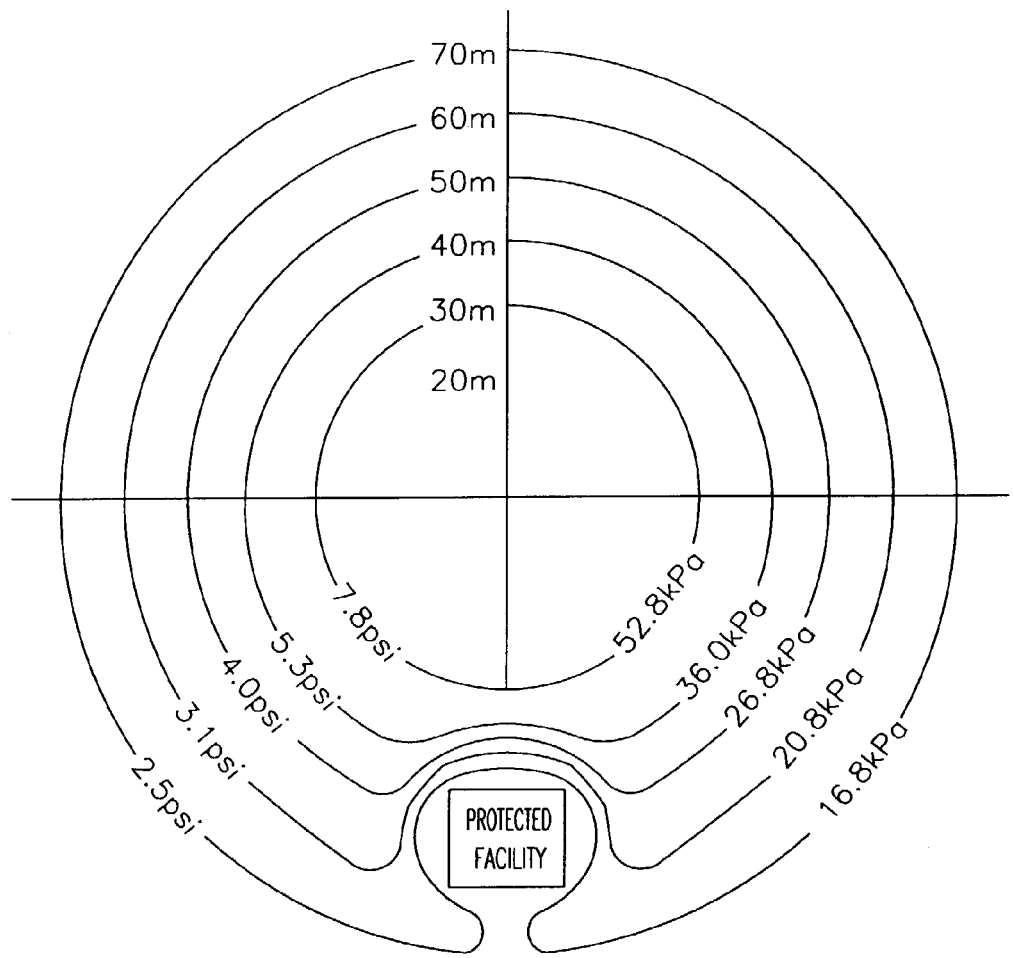

FIG. 18 illustrates the reduction of incident pressure around protected facility when the device of this invention is in use.

DRAWINGS—REFERENCE NUMERALS

| | |
|---|---|
| 101 | container |
| 102 | interior of container |
| 103 | diaphragm |
| 104 | groove |
| 105 | mounting means |
| 106 | wall |
| 107 | frame |
| 108 | fence |
| 109 | pump |
| 110 | check valve |
| 111 | duct |
| 112 | pressure detector |
| 113 | amplifier |
| 114 | igniter |
| 115 | pyrotechnic charge |
| 116 | valve |
| 117 | valve actuator |
| 118 | ejector |
| 119 | solid fuel gas generator |
| 120 | diffuser |
| 121 | compression wave |
| 122 | nozzle |
| 123 | ejector diffuser |

DETAILED DESCRIPTION OF THE INVENTION

Figure 1A:
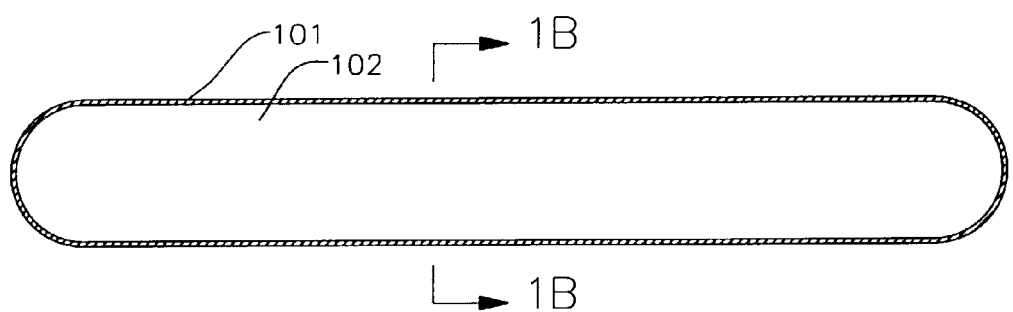
FIGS. 1A and 1B show a cross-sectional view of the blast compression wave absorbing device according to one embodiment of the present invention in a form of container, filled with gaseous matter.
Figure 1B:
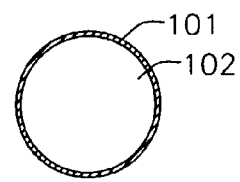
Figure 2A:
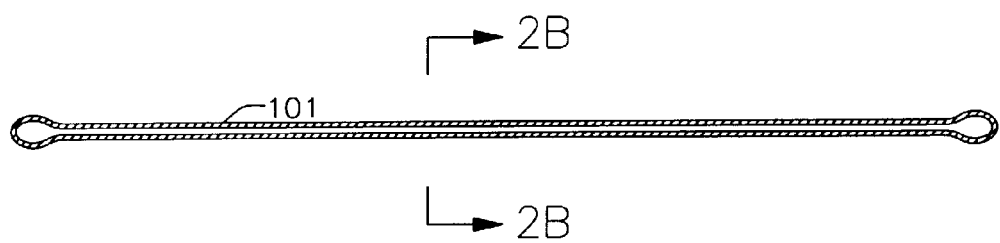
FIGS. 2A and 2B show a cross-sectional view of the container shown in FIGS. 1A and 1B, in collapsed form.
Figure 2B:
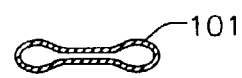

Referring to FIG. 1A and FIG. 1B of the drawings, a blast compression wave absorbing device consists of a hollow thin-walled cylindrical container 101 having an interior 102 filled with a gas (for example, with air, nitrogen or carbon dioxide). The gas has a pressure below ambient pressure (below atmospheric pressure or, for submerged objects, below hydrostatic pressure at the depth of installation), for example, 1 psia (7 kPa abs). The container 101 has sufficiently thin walls designed to collapse or rupture at a predetermined external pressure, for example, at 4 psig (27.2 kPa gauge). The container 101 in collapsed form can be seen in FIG. 2A and FIG. 2B. If the container 101 collapses, the ambient air (or water) starts to fill the void (the space previously being a part of container). This movement of air (or water) generates an area with reduced pressure around the container (a negative pressure wave). The negative pressure wave interferes with blast compression wave and effectively reduces blast compression wave peak pressure and associated impulse in predetermined area. The amplitude and the duration of the negative pressure wave depend on the container internal volume, the pressure difference between the gaseous matter inside the container and ambient pressure, and the contact area between container internals and the environment. If the container ruptures, the ambient air (or water) starts to fill the interior of the container. The movement of air (or water) generates a negative pressure wave, which interferes with blast compression wave and effectively reduces blast compression wave peak pressure and associated impulse in predetermined area.

After explosion, the blast compression wave reaches the container placed between an object to be protected and a potential source of compression wave. The container collapses or ruptures when the pressure of compression wave reaches a predetermined value, for example, 4 psig (27.2 kPa gauge). The container generates the negative pressure wave until the air stops filling the void. As a result of interference of compression wave and negative pressure wave, the peak pressure of compression wave in the area around the container reduces.

As can be seen from FIG. 3A, FIG. 3B, and FIG. 3C, the container 101 has a rupturable diaphragm 103 with a groove 104. Similarly, the diaphragm 103 is designed to rupture at predetermined external pressure, for example, at 4 psig (27.2 kPa gauge). The container shown in FIG. 4A, FIG. 4B, and FIG. 4C consists of a group of connected by welding half cylinders having rupturable diaphragms 103. The container 101 can be provided with pressure indicator and nipple (not shown) to connect the container internals with vacuum pump in order to restore deteriorating internal pressure if required. The relatively long containers (longer than 2 m) can be provided with several diaphragms.

As can be seen in FIG. 5, a plurality of collapsible or rupturable containers can be attached by mounting means 105 to a wall 106 of the building being protected (embassy, hangar, nuclear installation, or any other high-risk facility). The containers can be placed in the post-supported or freestanding frame 107 (see FIG. 6) on the ground level around the building, or be attached to the external surface of submerged structure to be protected. After explosion, the compression wave propagates radially from the burst point. When the compression wave reaches the container 101, it collapses (in case of collapsible container) or its diaphragm ruptures, the ambient air starts to fill the container generating the negative pressure wave. The collapsed cylindrical container can be seen in FIG. 2A and FIG. 2B. The negative pressure wave interferes with compression wave and reduces its peak pressure and associated impulse in the area around the container. As a result, an object being protected is subjected to a resulting pressure wave with substantially reduced peak pressure and impulse. The required negative pressure wave parameters depend on maximum allowable peak overpressure and impulse of the structure (object) being protected. The containers can also be placed on the ceiling of a tunnel (see FIG. 7) or in a bunker to protect from fuel-air explosives (FAE) and associated compression waves.

As can be seen in FIG. 8, a plurality of collapsible containers 101 can be attached to the external surface of the wall 106 of the hangar. The containers can be attached to the internal walls of the building in the areas with insufficient venting capabilities and subjected to a highest impulse in case of internal explosion (see FIG. 9). To protect the high-risk facility such as embassy or nuclear installation from large vehicle bombs, a plurality of freestanding or post-supported frames 107 with containers should be placed around the building within a fence 108 (see FIG. 10).

In case of building demolition involving shaped charges of explosives of known weights and power, the aforementioned embodiment of blast compression wave absorbing device can be used to prevent propagation of compression waves that cause a glass breakage in adjacent buildings.

Another embodiment of the invention is shown in FIG. 11A and FIG. 11B. The blast compression wave absorbing device is provided with container 101 having internals 102 filled with the gas at a pressure below atmospheric pressure, for example, in the range of 0.01 psia to 1.0 psia. In this embodiment, container 101 is located below the ground level. Rupturable diaphragm 103 covers an opening in a duct 111 connecting container 101 to the atmosphere. A suction of a vacuum pump 109 is connected to container 101. A check valve 110 is installed upstream of the vacuum pump 109 to prevent an air ingress when vacuum pump 109 is not operating. Diaphragm 103 is positioned between a source of compression wave and the wall 106 of the building being protected. A diffuser 120 positioned at the end of the duct 111. When a compression wave 121 having a peak pressure, exceeding predetermined pressure (for example, 4 psi (27.2 kPa)), reaches diaphragm 103, it ruptures allowing the air between diffuser 120 and wall 106 of the building being protected to enter container 101. The generated negative pressure wave propagates outside and interferes with moving compression wave 121 and reduces the peak pressure and impulse affecting the wall 106 of the building. Diffuser 120 directs the negative pressure wave to the wall 106. After explosion, diaphragm 103 should be replaced, and vacuum pump 109 should be restarted to restore the vacuum in container 101. Because the air ingress is always present in vacuum systems, the internal pressure detector or pressure switch (not shown) can be provided to start the vacuum pump when internal pressure in container 101 deteriorates.

In addition to the elements shown in FIG. 11A and FIG. 11B, the blast compression wave absorbing device as seen in FIG. 12A and FIG. 12B is provided with an external pressure detector 112 positioned between a potential source of compression wave and the building being protected, an amplifier 113, an igniter 114, and at least one small explosive (pyrotechnic) charge 115. The pressure detector 112 is located outside container 101 and measures an ambient pressure. If the peak pressure or the impulse of the compression wave exceeds predetermined level, the pressure detector 112 changes its output (electrical current or voltage). Amplifier 113 generates an electrical signal sufficient to activate the igniter 114. Igniter 114, which can be of any well-known construction suitable for this purpose, provides a detonating electrical impulse and initiates an explosion of pyrotechnic charge 115. The diaphragm 103 ruptures, connecting internals 102 of the container 101 with atmosphere and generating the negative pressure wave. When diaphragm 103 with pyrotechnic charge 115 is replaced, the vacuum pump 109 should be restarted to restore the vacuum in container 101.

The blast compression wave absorbing device as seen in FIG. 11A and FIG. 12A can be used if the second explosion immediately after the first one is improbable.

Another embodiment of the invention is shown in FIG. 13. It differs from the blast compression wave absorbing device shown in FIG. 11A by having a valve 116 and a valve actuator 117. The valve 116 is actuated by the valve actuator 117, which is actuated by amplifier 113. Amplifier 113 generates a signal sufficient to actuate the valve actuator 117 if the peak pressure or the impulse of compression wave 121 exceeds predetermined level as detected by pressure detector 112. Valve actuator 117 can be of any well-known construction suitable for this purpose, for example, an electrical motor. Another example is a pneumatic actuator having a solenoid valve connected to a source of compressed air (not shown). The solenoid valve is electrically connected to amplifier 113. Solenoid valve opens and allows compressed air to move valve actuator 117 and open the valve 116. The opening time of valve 116 should be relatively short, for example, in the range of 200 milliseconds. The valve 116 opens, allowing the ambient air to move into container 101 and to generate negative pressure wave, which interferes with blast compression wave and reduces the peak pressure and the impulse affecting the wall 106 of the building. The valve 116 closes when the compression wave passes pressure detector 112 and the air pressure around pressure detector 112 drops below the predetermined level. The vacuum in the container 101 deteriorates due to air in-leakage or due to opening of the valve 116. An internal pressure detector (pressure switch), which is not shown in FIG. 13, detects the higher pressure in the container than a set pressure (for example, 0.1 psia). Vacuum pump 109 starts in order to restore the set pressure in container 101. When the vacuum is restored, the blast compression wave absorbing device is ready to suppress the compression wave generated by next explosion.

In the embodiment of the invention disclosed in FIG. 14, the blast compression wave absorbing device is also provided with external pressure detector 112, amplifier 113 and valve actuator 117. It differs from the blast compression wave absorbing device shown in FIG. 13 by having an ejector 118 to maintain a predetermined pressure (vacuum) in container 101. Ejector 118 can be started either manually, by operator, or automatically, by well known automatic pressure control means, for example, by pressure switch (not shown). Ejector 118 can use a high-pressure water, compressed gas, or compressed air as a motive fluid (the sources of motive fluid are not shown). When the vacuum in container 101 deteriorates and should be restored, one of ejectors 118 starts. The vacuum generated by ejector 118 evacuates the air from the internals of container 101 through appropriate check valve 110 connected to a suction line of ejector 118. When the vacuum in container 101 is restored, the blast compression wave absorbing device is ready to suppress a compression wave generated by next explosion.

The FIG. 15 discloses a cross-sectional view of the ejector with a solid fuel gas generator as an example of ejector shown in FIG. 14. Ejector 118 is provided with a solid fuel gas generator 119 connected to a nozzle 122, and an ejector diffuser 123. The solid fuel gas generators are well known and widely used as solid fuel rocket engines, gas generation charges for various purposes, etc. The solid fuel gas generator 119 develops a high velocity flow of hot gas in the nozzle 122 of ejector 118. Ejector 118 develops a vacuum in the suction line and removes the air from container 101. Ejector 118 discharges the air to atmosphere through the ejector diffuser 123.

FIG. 16 discloses a graph demonstrating a reduction in incident and reflected pressure of blast compression wave vs. capacity of the blast compression wave absorbing device.

FIG. 17 discloses a graph demonstrating a reduction in incident and reflected impulse of blast compression wave vs. capacity of the blast compression wave absorbing device. The capacity is measured by an ability of the blast compression wave absorbing device to generate the negative incident impulse (measured in psi-msec) at the standard distance from the device. In this example, if the incident impulse should be reduced from 22 psi-msec to 10 psi-msec, the blast compression wave absorbing device should have a capacity of 12 psi-msec. The calculated incident pressure of 6 psi at the surface of the facility being protected will be reduced to 2.7 psi (in this example). To do that, the blast compression wave absorbing device should be placed at appropriate distance from the wall of the facility.

FIG. 18 illustrates the reduction of incident pressure around protected facility when the device of this invention is in use.

What is claimed is:

1. A blast compression wave absorbing device, comprising an airtight container having a wall defining an interior of the container, at least a part of said interior being filled with a gaseous matter having internal pressure below external pressure outside the container, and a means for flow communication between a blast compression wave propagating outside the container and said part of said interior of said container, said means for flow communication being mechanically connected to said wall of said container.

2. The blast compression wave absorbing device of claim 1, wherein said means for flow communication between said blast compression wave and said part of said interior of said container comprise a part of said wall of said container collapsible inward at a predetermined external pressure.

3. The blast compression wave absorbing device of claim 1, wherein said means for flow communication between said blast compression wave and said part of said interior of said container comprise a part of said wall of said container ruptureable in inward direction at a predetermined external pressure.

4. The blast compression wave absorbing device of claim 3, wherein said part of said wall of said container ruptureable at a predetermined external pressure comprises a ruptureable diaphragm being arranged to rupture at a predetermined external pressure.

5. The blast compression wave absorbing device of claim 1, wherein said means for flow communication between said blast compression wave and said part of said interior of said container comprises a valve.

6. The blast compression wave absorbing device of claim 5, wherein said valve is electrically actuated.

7. The blast compression wave absorbing device of claim 1, further comprising at least one pressure detector being arranged to actuate said means for flow communication between said blast compression wave and said part of said interior of said container at a predetermined external pressure.

8. The blast compression wave absorbing device of claim 1, further comprising a means to maintain a predetermined pressure of said gaseous matter in said container.

9. The blast compression wave absorbing device of claim 8, wherein said means to maintain a predetermined pressure of said gaseous matter in said container comprise a vacuum pump having a suction connection, said suction connection being in flow communication with said part of said interior of said container.

10. The blast compression wave absorbing device of claim 8, wherein said means to maintain a predetermined pressure of said gaseous matter in said container comprise a source of compressed gas and a gas ejector having a suction connection and a nozzle, said nozzle being in flow communication with said source of compressed gas, said suction connection of said gas ejector being in flow communication with said part of said interior of said container.

11. The blast compression wave absorbing device of claim 10, wherein source of compressed gas comprises at least one solid fuel gas generator.

12. The blast compression wave absorbing device of claim 1, further comprising a diffuser being in flow communication with said part of said interior of said container, said diffuser being directed at the object being protected.

* * * * *